(12) United States Patent
Hammen et al.

(10) Patent No.: US 7,119,310 B2
(45) Date of Patent: *Oct. 10, 2006

(54) U-FLOW VENTILATED SEALING HEAD

(75) Inventors: Richard R. Hammen, Waupaca, WI (US); Ronald F. May, Lannon, WI (US)

(73) Assignee: Enercon Industries Corporation, Menomonee Falls, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/511,044

(22) PCT Filed: Apr. 11, 2003

(86) PCT No.: PCT/US03/11077

§ 371 (c)(1),
(2), (4) Date: Apr. 29, 2005

(87) PCT Pub. No.: WO03/088717

PCT Pub. Date: Oct. 23, 2003

(65) Prior Publication Data

US 2005/0224184 A1   Oct. 13, 2005

Related U.S. Application Data

(60) Provisional application No. 60/372,496, filed on Apr. 12, 2002.

(51) Int. Cl.
*H05B 6/14* (2006.01)
*H05B 6/42* (2006.01)
*B23B 31/26* (2006.01)
*B65B 51/10* (2006.01)

(52) U.S. Cl. .............. 219/632; 219/633; 219/677; 219/660; 156/69; 156/379.6; 53/477

(58) Field of Classification Search ............ 219/632, 219/633, 635, 670, 672, 677; 156/272.4, 156/69, 379.6, 379.8, 380.2, 380.6; 53/DIG. 2, 53/477; 439/271, 374, 378, 380
See application file for complete search history.

(56) References Cited

U.S. PATENT DOCUMENTS

| | | | |
|---|---|---|---|
| 6,153,864 A | 11/2000 | Hammen et al. | 219/632 |
| 6,649,022 B1 * | 11/2003 | Hammen et al. | 219/633 |
| 6,713,735 B1 * | 3/2004 | Terano | 219/632 |
| 2001/0032839 A1 | 10/2001 | Herzog | 219/633 |
| 2002/0020144 A1 | 2/2002 | Sarles et al. | 53/329 |
| 2003/0062130 A1 | 4/2003 | Hammen et al. | 156/380.6 |

* cited by examiner

*Primary Examiner*—Philip H. Leung
(74) *Attorney, Agent, or Firm*—Quarles & Brady LLP

(57) ABSTRACT

An inductive cap sealer (10) for sealing an inner seal over an opening (54) in container (52) includes a vented sealing head (12). The sealing head (12) contains an induction coil (24) for producing an electromagnetic field when energized by a power supply. Field focusing elements (26) contain the coil (24) and direct the electromagnetic field to a sealing region beneath the sealing head (12). The housing (20) has a central inlet vent (40) flanked by two outlet vents (42, 44) aligned with a vent plate (46) inside the housing (20) having a plurality of small openings (48) which allow a fan (18) to blow cooling air through the sealing head from only one side of the sealing head (12) in a generally U-shaped flow pattern, preferably from the side opposite the sealing region. The field focusing elements (26) are spaced to allow the cooling air to flow around the field focusing elements (26) and past the coil (24).

16 Claims, 5 Drawing Sheets

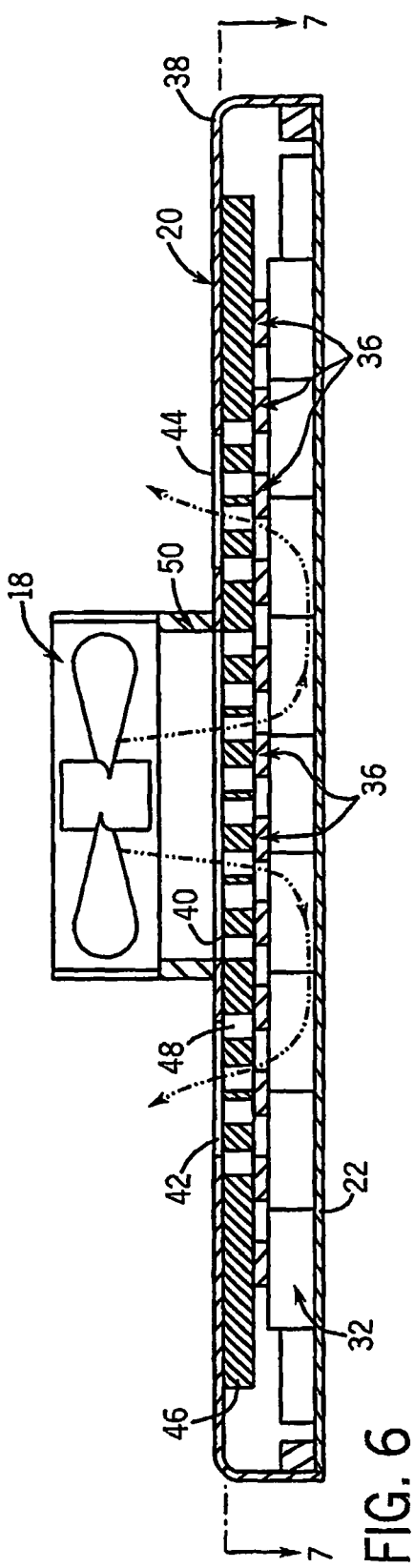
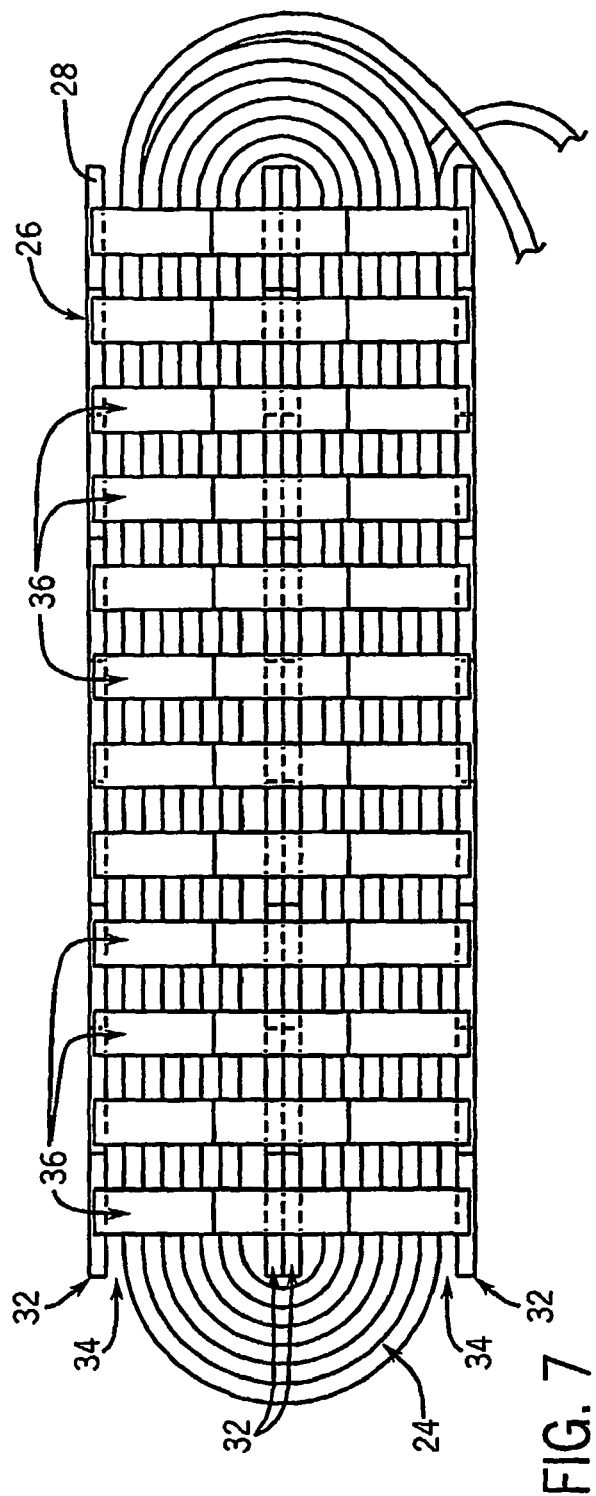
FIG. 6
FIG. 7

U-FLOW VENTILATED SEALING HEAD

CROSS REFERENCE TO RELATED APPLICATIONS

This application claims benefit to U.S. provisional application Ser. No. 60/372,496, filed Apr. 12, 2002.

STATEMENT OF FEDERALLY SPONSORED RESEARCH/DEVELOPMENT

Not applicable.

BACKGROUND OF THE INVENTION

1. Field of the Invention

The invention relates to the field of heat sealing caps to containers, and in particular, to air cooled sealing heads for inductive cap sealers.

2. Discussion of the Prior Art

It is known to seal the mouths of bottles and other containers using an inductive sealing process. Inductive sealing requires an electromagnetic-field-producing apparatus and a foil-polymer seal. Typically, the apparatus has at least one coil of wire wound to produce an electromagnetic field when electric current is supplied to the coil. It is well known in the art that electromagnetic fields induce eddy currents within metal which in turn heat the metal. The seal comprises a thin layer of aluminum foil onto which is laminated a polymer layer that is molecularly compatible with the container to be sealed. When the seal is placed onto the container and the container is placed within the electromagnetic field, the foil is heated which melts the layer of polymer. Removing the seal from the electromagnetic field allows the polymer to cool and molecularly fuse with the container to create an air-tight seal.

The strength of the electromagnetic field primarily depends upon the number of turns in the wire coil(s) and the amount of current supplied to the coil(s). To produce an electromagnetic field adequate for commercial inductive sealing, typically the power supply must output power in the order of a few kilowatts, which produces a great deal of heat. Thus, the power supply must be cooled in order to function properly. Similarly, the sealing head having the induction coil must be cooled.

Many methods of cooling the power supply and sealing head are known in the art. In particular, it is known to circulate cool water through the power supply enclosure and the sealing head. Such water cooled cap sealers, however, require complicated piping configurations that increase size and cost. It is also known to vent the power supply and force air past the outside of the sealing head. However, such air cooled cap sealers sometimes provide inadequate cooling of the sealing head which degrades the operating efficiency of the cap sealer. Also, passing cooling air into the area where the containers are being sealed can disrupt the position of the seal and/or introduce contaminants into the container of the seal.

SUMMARY OF THE INVENTION

The invention provides a ventilated sealing head for an inductive cap sealer in which the cooling air is not directed into the sealing region.

Specifically, the sealing head includes a housing having openings at one side in which at least one is an inlet allowing air from a fan to pass into the housing. The housing contains an induction coil producing an electromagnetic field when energized that is disposed in a field focusing cradle directing the electromagnetic field toward a sealing region at a side of the sealing head opposite the openings in the housing.

In one preferred form, the openings in the housing provide both an inlet and an outlet for expelling cooling air passed in through the inlet by the fan. The inlet and the outlet lie in the same plane and the cooling air entering the housing through the inlet passes through a bend of greater than ninety degrees before exiting through the outlet. More preferably, the bend is greater than 135 degrees and even more preferably the bend is essentially 180 degrees for at least a portion of the cooling air passing from the inlet to the outlet. There can be one large, central inlet flanked by two outlets aligned with a vent plate inside the housing between the coil and the vented side of the housing having numerous small openings aligned with the vents in the housing.

In another preferred form, the device includes an air guide disposed between the fan and the sealing head for directing air from the fan into the inlet. Preferably, the air guide is a rectangular frame defining an air passage through its center.

In yet another preferred form, the field focusing cradle includes a plurality of ferrite elements spaced apart along at least a portion of the periphery of the coil allowing cooling air to flow therebetween. Preferably, the coil is bundled wire, such as Litz wire. Additionally, the side of the sealing head opposite the air openings can be flat for sealing wide mouthed containers or tunneled for sealing narrow necked containers.

Another aspect of the invention provides an apparatus for inductively sealing an inner seal over an opening in a container. The sealer includes an AC power supply, a fan and an external sealing head. The sealing head has a housing containing an induction coil for producing an electromagnetic field when energized by the power supply and field focusing elements arranged to direct the electromagnetic field to a sealing region at one side of the sealing head. The fan is arranged to pass cooling air through the housing past the coil from a single side of the sealing head opposite the sealing region. Preferably, the housing includes a plurality of coplanar inlet and outlet openings allowing cooling air from the fan to pass through the housing in an essentially U-shaped path, so as not to blow into the area where the containers are being sealed.

The invention thus provides a vented sealing head for an inductive cap sealer. Venting the sealing head allows cooling air to be blown passed the coil and field focusing elements to carry away heat from these components and convectively cool the sealing head. The sealing head can thus be cooled without a separate cooling circuit and without the costly and difficult to assemble tubing arrangements associated with liquid cooling. Further, the air enters and exits the sealing head from the same side. This provides additional advantages in that air delivery and exhaust systems can be fed to the top of the sealing head if needed and more effectively carry away the exhausted air. Importantly, since the exhausted air is directed out the top side of the housing, it does not flow toward the containers being sealed, thereby reducing or eliminated any chance of the exhaust air introducing contaminants to the seal or container or of shifting the position of the seal or cap prior to sealing.

The foregoing and other advantages of the invention will appear from the following description. In that description reference is made to the accompanying drawings, which form a part hereof, and in which there is shown by way of illustration a preferred embodiment of the invention. This embodiment does not represent the full scope of the invention. Thus, the claims should be looked to in order to judge the full scope of the invention.

BRIEF DESCRIPTION OF THE DRAWINGS

FIG. 6 is a cross-sectional view taken along line 6—6 of FIG. 4 showing the U-shaped flow paths of air passing from the cooling fan through the sealing head; and FIG. 7 is a top view taken along line 7—7 of FIG. 6 showing the field focusing cradle and coil in isolation.

DETAILED DESCRIPTION OF THE PREFERRED EMBODIMENT

Figure 1:
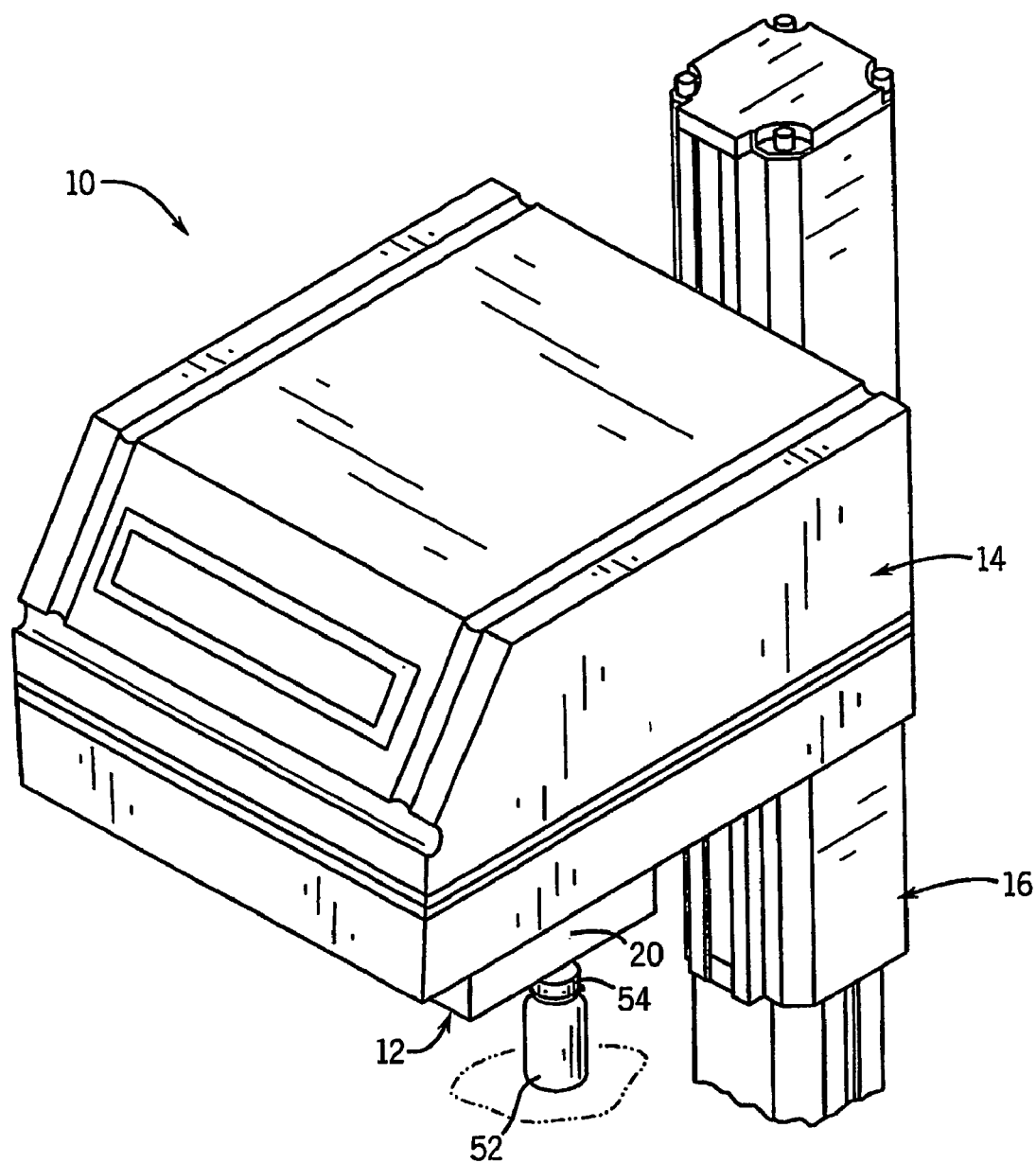
FIG. 1 is a front perspective view of an inductive air cooled cap sealer having a U-flow vented sealing head according to the present invention.
Figure 2:
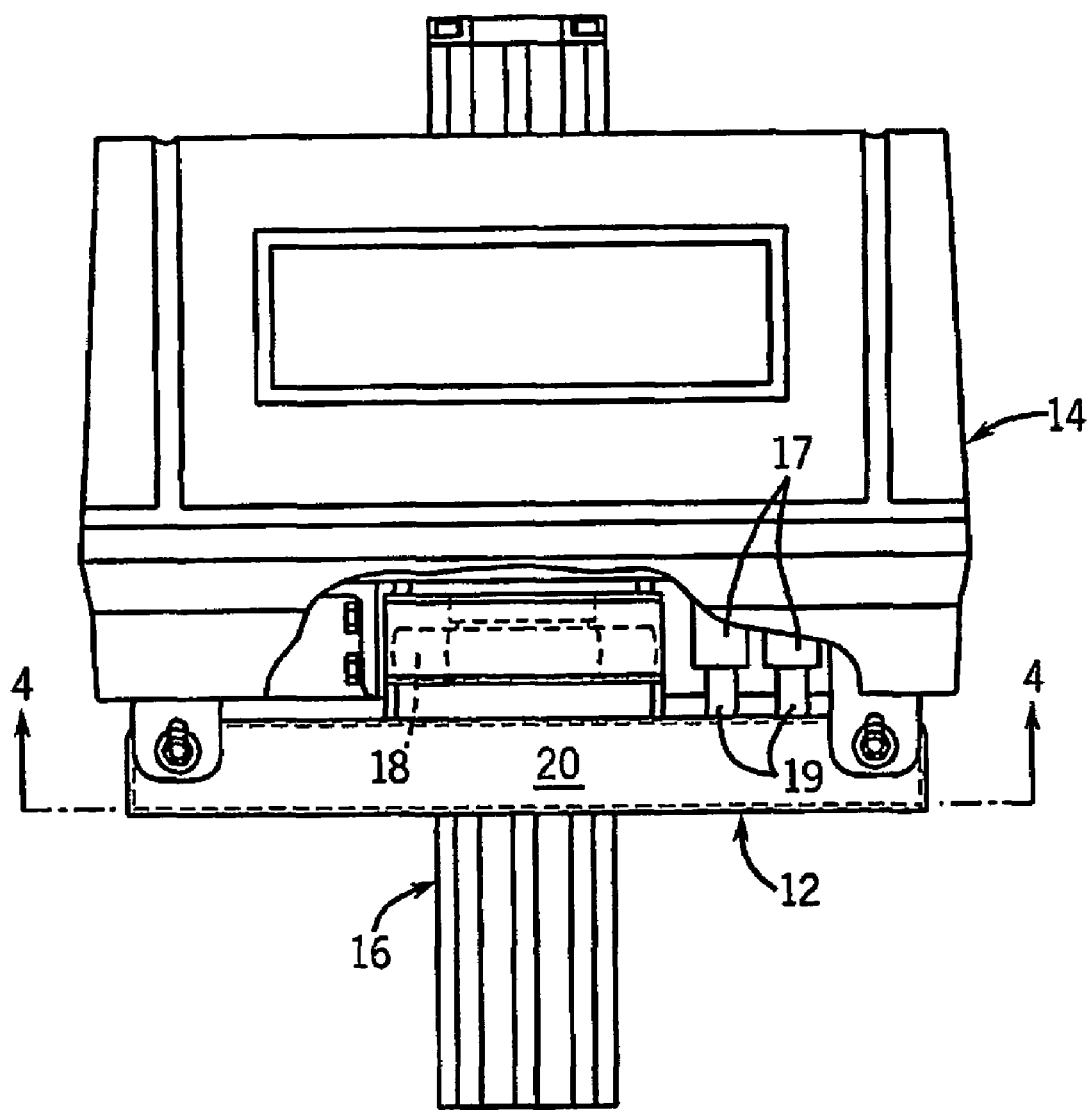
FIG. 2 is a front view thereof partially cut away to review a cooling fan located above the sealing head.

An air cooled cap sealer 10 is shown in FIGS. 1 and 2, which is preferably of the type described in U.S. Pat. No. 6,153,864 and pending U.S. application Ser. No. 09/970,330, filed Oct. 3, 2001, both of which are hereby incorporated by reference as though fully set forth herein. Generally, the cap sealer 10 has a sealing head 12 powered by and mounted to a power supply cabinet 14 supported on an adjustable mounting assembly 16. The sealing head 12 is electrically connected to the power supply cabinet 14 via a pair of bus wires (not shown) coupled to shielded, plug-in type connectors 17 mateable with socket connectors 19 on the sealing head 12. Preferably, two cooling fans 18 (one shown in FIG. 2) are mounted between the sealing head 12 and the power supply cabinet 14, one cooling the sealing head 12 and the other the power supply cabinet 14. The sealing head 12 is vented to improve cooling by allowing cooling air to pass through the sealing head 12, as described below.

Figure 3:
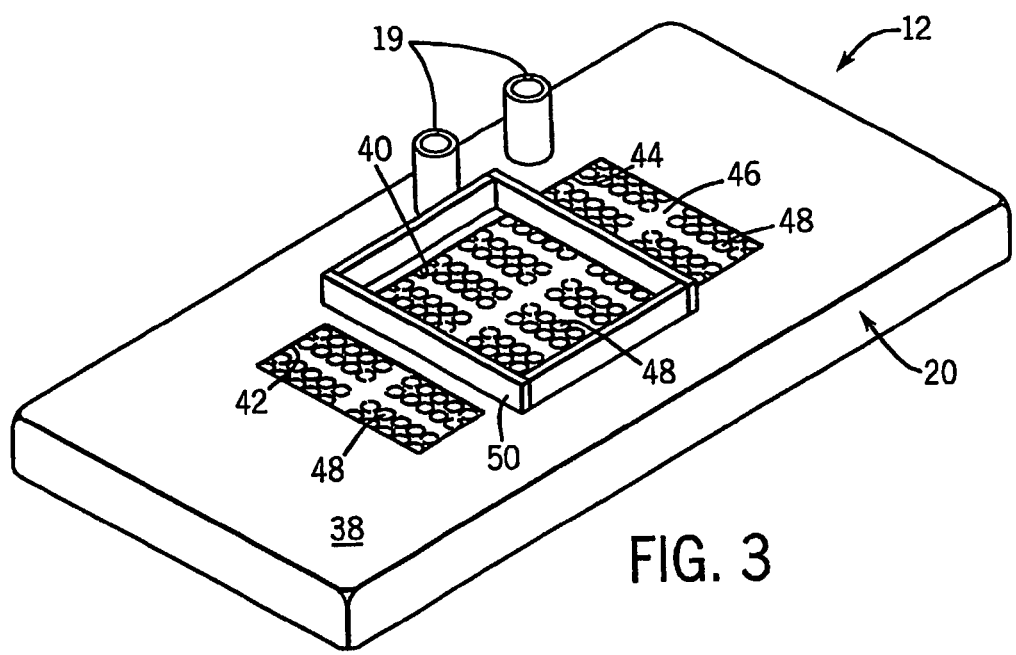
FIG. 3 is top perspective view of the U-flow ventilated sealing head.
Figure 5:
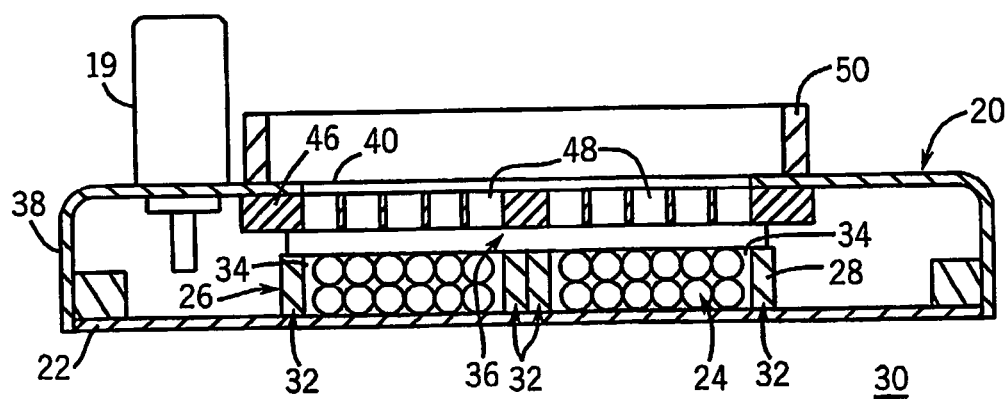
FIG. 5 is a cross-sectional view taken along line 5—5 of FIG. 4.
Figure 4:
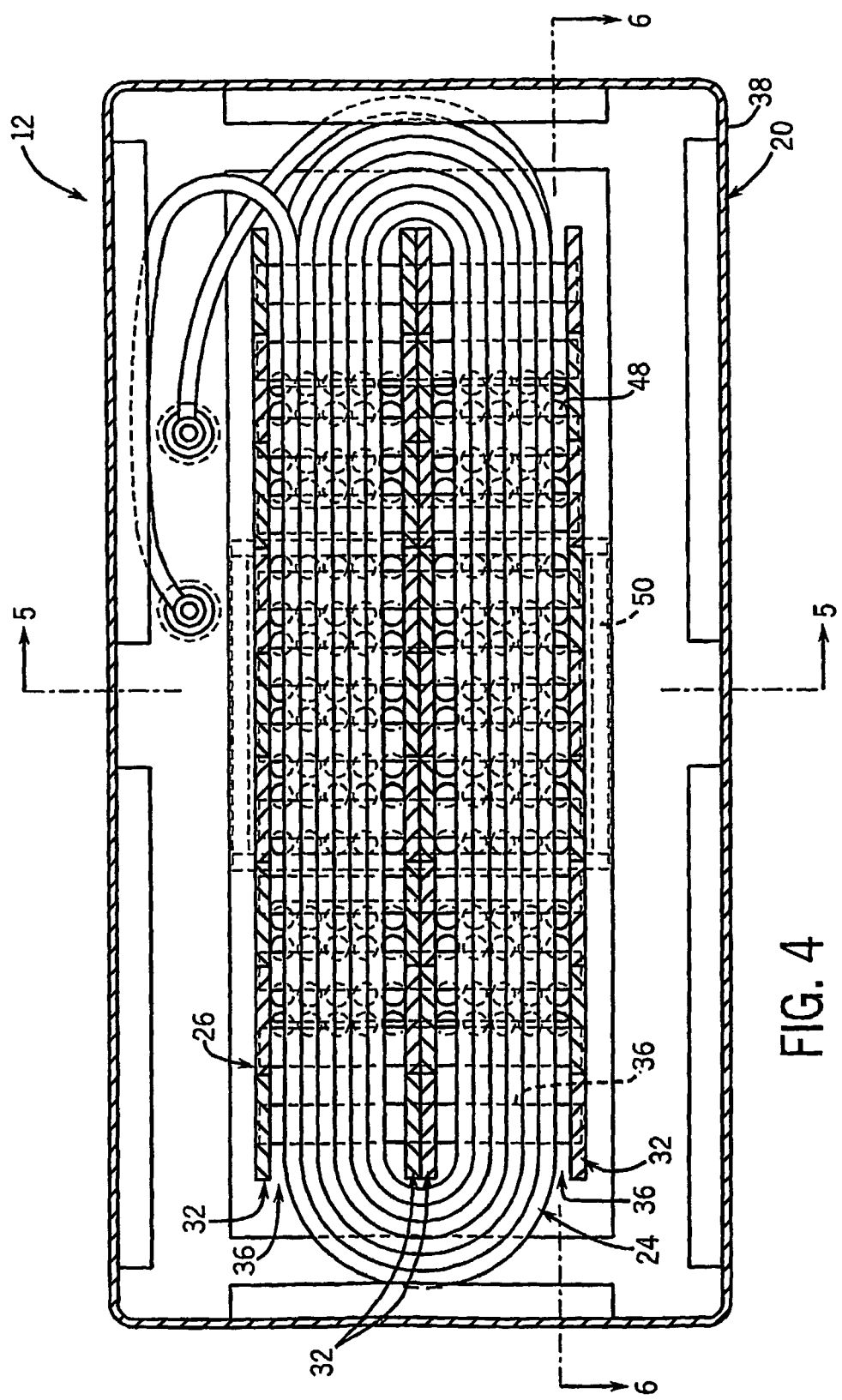
FIG. 4 is a cross-sectional view of the sealing head taken along line 4—4 of FIG. 2 showing a Litz wire coil wound within a cradle formed of ferrite field focusing elements.

Referring to FIGS. 3–5, the sealing head 12 has a housing 20 with a flat bottom cover 22 containing an electromagnetic coil 24 wound about a coil cradle 26 formed from on, or more preferably multiple electromagnetic field focusing elements joined together by a suitable epoxy resin. The coil 24 is formed of bundled wire, such as Litz wire, known to those skilled in the art. The number of windings and the gauge of the wire are selected according to the sealing requirements of the application, as. known in the art. Referring to FIGS. 4–7, the coil cradle 26 is comprised of a number of rectangular blocks 28 made of a ferromagnetic compound having ferric oxide, so that, rather than radiating omni-directionally, the electromagnetic field produced by the coil 24 is directed downward to a sealing region 30 below the sealing head 12. In the embodiment shown in the figures, some of the blocks 28 are end to end in four parallel rows 32 extending nearly the full side to side dimension of the sealing head 12, with the two inner rows being in face to face contact. These rows 32 define two parallel channels 34 in which the coil 24 is wound. Twelve cross-rows 36, each have three blocks end to end, are disposed perpendicular to the rows 32 along the top side of the rows 32. The cross-rows 56 are spaced apart approximately the width of a block 28 to provide air flow passages. The arrangement of the field focusing blocks 28 forming the coil cradle 26 has been empirically shown to direct the electromagnetic field for the energized coil toward the sealing region 30 while allowing convective cooling of the blocks 28 and the coil 24.

The housing 20 is preferably made of an ABS plastic material and comprises an inverted tray 38 and a flat bottom cover 22. The tray 38 has a rectangular top with downwardly extending walls along its periphery. The bottom cover 22 is fastened to the tray 38 by a suitable adhesive applied to their edges or as disclosed in the '864 patent. The top of the inverted tray 38 has a large generally square inlet vent 40 flanked by two smaller rectangular outlet vents 42 and 44. At the inside of the housing 20 is a large rectangular vent plate 46 with a plurality of circular openings 48 grouped into three sets aligned with the inlet 40 and outlet 42 and 44 vents. An air guide 50 is mounted to the top of the housing 20 to surround the inlet cut vent 40. The air guide 50 is a generally square frame bolted together and to the vent plate 46. The air guide 50 fits between one of the fans 18 and the sealing head 12 to channel the air from the fan 18 into the housing through the inlet vent 40 and the associated openings 48 in the vent plate 46.

Referring to FIG. 6, air is blown by the fan 18 above the sealing head 12 into the inlet 40 and associated openings 48 in the top of the housing tray 38. A portion of the air flow will be interrupted by the blocks 28 and/or the coil 24 such that it will circulate through the sealing head 12 from front to back and side to side allowing most, if not all, of the coil 24 and coil cradle 26 to be cooled convectively. Moreover, warmer portions of the coil 24 will pass heat to cooler portions of the coil 24 so that the coil 24 will be conductively cooled as well. Since the bottom cover 22 is ventless, air passed into the housing 20 from the fan 18 will be redirected backwards by the cover 22 to pass through the outlet vents 42 and 44 and the associated openings 48 in the vent plate 46. The cooling air will preferably bend through an angle of at least 135 degrees and at least some of the cooling air will turn through approximately a 180 degree bend before exiting through the outlet vents 42 and 44.

The invention thus provides a vented sealing head for an inductive cap sealer. Venting the sealing head allows cooling air to be blown passed the coil and field focusing elements to carry away heat from these components and convectively cool the sealing head. The sealing head can thus be cooled without a separate cooling circuit and without the costly and difficult to assemble tubing arrangements associated with liquid cooling. This arrangement provides an effective way to distribute cooling air into and throughout the sealing head so as to cool the entire coil. Further, the air enters and exits the sealing head from the same side. This provides additional advantages in that air delivery and exhaust systems can be fed to the top of the sealing head if needed and more effectively carry away the exhausted air. More importantly, since the exhausted air is directed out the top side of the housing, it does not flow toward the containers being sealed, thereby reducing or eliminated any chance of the exhaust air introducing contaminants to the seal or container or of shifting the position of the seal or cap prior to sealing.

With reference to FIGS. 1 and 2, the cap sealer 10 is operated by first adjusting it vertically if needed according to the height of a container 52 to be sealed. The mouth of the container 52 is then covered with an inner seal (not shown) having a polymer layer laminated to an aluminum foil layer. A cap 54 is snapped, screwed or otherwise fit onto the mouth of the container 52, which places a downward force on the inner seal. The container 52 is then placed upright with the cap 54 under the sealing head 12 in the sealing region 30. Applying power to the coil 24 produces an electromagnetic field directed downwardly from the sealing head 12 to the sealing region 30 for a prescribed period of time which heats the foil layer and melts the polymer layer. The container 52 is removed from beneath the sealing head 12 which allows the polymer layer to cool and fuse to the mouth of the container 52. The cap sealer 10 may be operated manually, placing one container 52 at a time beneath the sealing head 12, or it may be used to seal a number of containers 52 continuously or intermittently passing through the electromagnetic field under the sealing head 12 on a conveyor belt or similar assembly line.

An illustrative embodiment of the invention has been described in considerable detail for the purpose of disclosing practical, operative structure whereby the invention may be practiced advantageously. The design described is intended to be illustrative only. The novel characteristics of the invention may be incorporated in other structural forms without departing from the scope of the invention. For example, the sealing head can be interchangeably mounted to the power supply cabinet so that sealing heads of other configurations may be used for various sealing applications, such as a vented tunnel sealing head particularly suitable for narrow necked containers. Moreover, the sealing head may have more than one induction coil mounted in various orientations and the coil cradle could be monolithic with openings made therein for air to flow through it and past the coil.

It can thus be appreciated that many variations are possible from the preferred embodiment described above without departing from the spirit of the invention. Reference should therefore be made to the claims for interpreting the entire scope of the invention.

What is claimed is:

1. A ventilated sealing head for an inductive cap sealer, comprising:
    a housing having openings at one side including an inlet;
    a fan located to pass air into the housing through the inlet;
    an induction coil producing an electromagnetic field when energized disposed in the housing so as to be cooled by the air passing through the inlet; and
    a field focusing cradle disposed in the housing to direct the electromagnetic field of the coil toward a sealing region at a side of the sealing head opposite the openings in the housing.

2. The sealing head of claim 1, wherein at least one opening in the housing is an outlet for expelling cooling air passed into the housing by the fan.

3. The sealing head of claim 2, wherein the housing includes three openings including a central inlet and two outlets.

4. The sealing head of claim 3, further including a vent plate disposed in the housing having a plurality of openings aligned with the openings of the housing.

5. The sealing head of claim 4, wherein the vent plate openings are grouped into a set of inlet openings and two sets of outlet openings aligned with the respective one inlet and two outlet openings in the housing.

6. The sealing head of claim 2, wherein cooling air entering the housing through the inlet passes through a bend of greater than ninety degrees before exiting through the outlet.

7. The sealing head of claim 6, wherein the bend is greater than 135 degrees.

8. The sealing head of claim 7, wherein the bend is essentially 180 degrees for at least a portion of the cooling air passing from the inlet to the outlet.

9. The sealing head of claim 1, wherein the field focusing cradle includes a plurality of ferrite elements spaced apart along at least a portion of the periphery of the coil allowing cooling air to flow therebetween.

10. The sealing head of claim 1, wherein the coil is bundled wire.

11. The sealing head of claim 1, wherein the housing has a flat side adjacent the sealing region.

12. The sealing head of claim 1, further including an air guide disposed between the fan and the sealing head for directing air from the fan into the inlet.

13. The sealing head of claim 12, wherein the air guide is a rectilinear frame defining an air passage through its center.

14. An apparatus for inductively sealing an inner seal over an opening in a container, comprising:
    a power supply for producing alternating current;
    an external sealing head having a housing containing an induction coil for producing an electromagnetic field when energized by the power supply and field focusing elements arranged to direct the electromagnetic field to a sealing region at one side of the sealing head; and
    a fan arranged to pass cooling air through the housing past the coil without flowing into the sealing region.

15. The apparatus of claim 14, wherein the housing includes an inlet opening and at least one outlet openings at the side of the sealing head opposite the sealing region such that cooling air passed through the housing from the fan flows in an essentially U-shaped path.

16. The apparatus of claim 15, further including a vent plate mounted inside the housing between the coil and the inlet and outlet openings of the housing and aligned therewith.

* * * * *